(12) United States Patent
Shao et al.

(10) Patent No.: US 12,014,297 B2
(45) Date of Patent: Jun. 18, 2024

(54) METHODS FOR MANAGING SMART GAS WORK ORDER IMPLEMENTATION AND INTERNET OF THINGS (IOT) SYSTEMS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/346,179

(22) Filed: Jun. 30, 2023

(65) Prior Publication Data
US 2023/0342678 A1    Oct. 26, 2023

(30) Foreign Application Priority Data
May 22, 2023 (CN) .......................... 202310576893.3

(51) Int. Cl.
*G06Q 10/0631* (2023.01)
(52) U.S. Cl.
CPC .............................. *G06Q 10/06311* (2013.01)
(58) Field of Classification Search
None
See application file for complete search history.

(56) References Cited
U.S. PATENT DOCUMENTS
11,488,078 B2 * 11/2022 Balusani ........ G06Q 10/063116

FOREIGN PATENT DOCUMENTS
CN   105809329 B   12/2017
CN   114119315 A   3/2022
(Continued)

OTHER PUBLICATIONS

Ö. Y. Astepe and A. S. Alkara, "Predicting "Maintenance Priority" with AI," 2021 International Conference on Electrical, Communication, and Computer Engineering (ICECCE), Kuala Lumpur, Malaysia, 2021, pp. 1-6, doi: 10.1109/ICECCE52056.2021.9514218. (Year: 2021).*

(Continued)

*Primary Examiner* — Folashade Anderson
(74) *Attorney, Agent, or Firm* — METIS IP LLC (57) ABSTRACT

Embodiments of the present disclosure provide a method for managing smart gas work order implementation and IoT system, the method being executed by a smart gas management platform, comprising: obtaining gas work order information and user information from a library of work orders to be assigned; and determining an implementation priority of gas work orders based on gas work order information and user information; determining the implementation scheduling scheme for gas work order based on implementation priority; matching a pre-processing scheme for gas work order through a vector database based on at least one of work order type, fault type, and implementation scheduling scheme; and executing the pre-processing scheme at pre-processing time and pushing the pre-processing result to a work terminal of the implementer; determining the implementation scheduling scheme of gas work order according to the implementation priority of gas work order may reasonably arrange gas work order and improve the processing efficiency of gas work order. The implementation scheduling scheme and pre-processing scheme are determined based on various information, which considers the possible impact of multiple factors, improving the accuracy of processing of the gas work order.

6 Claims, 6 Drawing Sheets

(56) References Cited

FOREIGN PATENT DOCUMENTS

| | | |
|---|---|---|
| CN | 114386869 | 4/2022 |
| CN | 115356978 | 11/2022 |
| CN | 115358432 | 11/2022 |
| CN | 115938449 | 4/2023 |
| CN | 116109122 | 5/2023 |
| JP | 2010117912 A | 5/2010 |

OTHER PUBLICATIONS

A. Massaeli, "A program for developing of Risk-Based Inspection (RBI) and maintenance procedures modification for a gas treating plants of N.I.G.C.," 2015 International Conference on Industrial Engineering and Operations Management (IEOM), Dubai, United Arab Emirates, 2015, pp. 1-9 (Year: 2015).*

M. Guangyao et al., "Applications of Smart Energy Integrated Service Platform in Optimization of Energy Utilization of Customers," 2021 International Conference on Artificial Intelligence, Big Data and Algorithms (CAIBDA), Xi'an, China, 2021, pp. 30-36, doi: 10.1109/CAIBDA53561.2021.00014 (Year: 2021).*

Thonthe Chettiar et al "Face the Challenge to Reap the Benefits Automation and Smart Technology." Paper presented at the Abu Dhabi International Petroleum Exhibition & Conference, Abu Dhabi, UAE, Nov. 2020. doi: https://doi.org/10.2118/203062-MS (Year: 2020).*

Tong, Qiusheng, Application of Electronic Work Order Management System in Debugging Stage Of Nuclear Power Project, Project Management Technology, 2013, 10 pages.

Decision to Grant a Patent in Chinese Application No. 202310576893.3 mailed on Aug. 3, 2023, 4 pages.

First Office Action in Chinese Application No. 202310576893.3 mailed on Jul. 17, 2023, 13 pages.

* cited by examiner

METHODS FOR MANAGING SMART GAS WORK ORDER IMPLEMENTATION AND INTERNET OF THINGS (IOT) SYSTEMS THEREOF

CROSS-REFERENCE TO RELATED APPLICATION

The present application claims priority of Chinese Application No. 202310576893.3, filed on May 22, 2023, the contents of each of which are hereby incorporated by reference.

TECHNICAL FIELD

The present disclosure relates to the field of gas work order management, and in particular to a method for managing smart gas work order implementation and an Internet of Things (IoT) system.

BACKGROUND

With the increasing number of gas-related problems, there are often problems such as accumulation of work orders, and accumulation in a timely manner, resulting in inefficient work order processing. If gas work orders are not processed properly, the work progress of the related staff and the user's experience will be affected.

For how to efficiently process work orders, CN105809329B discloses an emergency repair call command system, which solves the problem of work order accumulation by using the work order management module to track and dispatch work orders, monitor the emergency repair timeout and order acceptance timeout status of work orders, and remind the order acceptor. However, the problem of not being able to process all work orders efficiently still arises because different users have different levels of acceptance of waiting time and urgency of work order processing.

Therefore, there is an urgent need to propose a method for managing smart gas work order implementation and an IoT system to improve the efficiency of gas problem processing.

SUMMARY

One or more embodiments of the present disclosure provide a method for managing smart gas work order implementation, the method being performed by a smart gas management platform, comprising: obtaining gas work order information and user information from a library of work orders to be assigned; wherein the gas work order information includes at least one of work order type, fault type, gas availability, and environmental condition at the fault point; and the user information includes at least one of gas usage, number of permanent residents, and gas-using equipment; determining an implementation priority of the gas work order based on the gas work order information and the user information; determining an implementation scheduling scheme for the gas work order based on the implementation priority; wherein the implementation scheduling scheme includes target implementation times; matching a pre-processing scheme for gas work orders through a vector database based on at least one of the work order type, the fault type, the implementation scheduling scheme, the pre-processing scheme comprising pre-processing content and pre-processing time; and executing the pre-processing scheme at the pre-processing time and pushing a pre-processing result to a work terminal of an implementer.

One or more embodiments of the present disclosure provide a system for managing smart gas work order implementation, a smart gas management platform of the system is configured to: obtain gas work order information and user information from a library of work orders to be assigned; the gas work order information including at least one of work order type, fault type, gas availability, and environmental condition at the fault point; and the user information includes at least one of gas usage, number of permanent residents, and gas-using equipment; determine an implementation priority of the gas work order based on the gas work order information and the user information; determining an implementation scheduling scheme for the gas work order based on the implementation priority; the implementation scheduling scheme including target implementation times; match a pre-processing scheme for gas work orders through a vector database based on at least one of the work order type, the fault type, the implementation scheduling scheme, the pre-processing scheme including pre-processing content and pre-processing time; and execute the pre-processing scheme at the pre-processing time and push a pre-processing result to a work terminal of an implementer.

One or more embodiments of the present disclosure provide a non-transitory computer readable storage medium, the computer readable storage medium storing computer instructions, wherein the method for managing smart gas work order implementation is implemented when the computer instructions are executed by a processor.

In some embodiments of the present disclosure, the implementation scheduling scheme of gas work order is determined according to the implementation priority of gas work order, which reasonably arranges gas work order and improves the processing efficiency of gas work order. The implementation scheduling scheme and pre-processing scheme are determined based on various information, which considers the possible impact of multiple factors, improving the accuracy of gas work order processing.

DETAILED DESCRIPTION

As mentioned above, CN105809329B only discloses tracking the work order and reminding timeout of the work order through the work order management module, without deeply combining specific information about users and work orders, which still does not solve the problem of reasonable scheduling and assigning of work orders. Therefore, in some embodiments of the present disclosure, the work order implementation priority is determined based on the gas work order information and user information, and the implementation time and implementer are determined based on the work order implementation priority and user acceptable time, which is conducive to improving the efficiency of work order processing and improving the user's experience and satisfaction.

Figure 1:
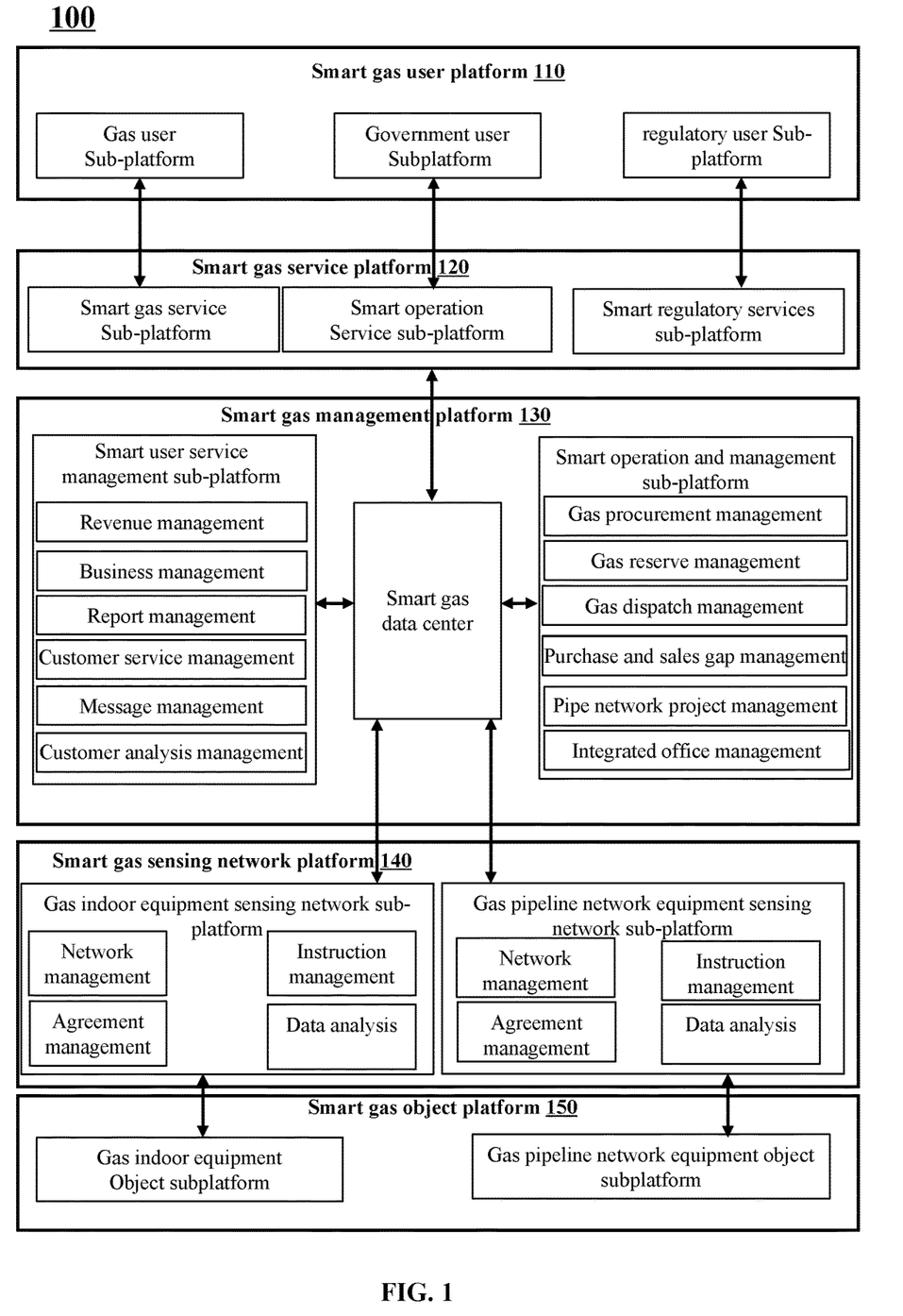
FIG. 1 is a diagram of the platform structure of an Internet of Things (IoT) system for managing smart gas work order implementation according to some embodiments of the present disclosure.

FIG. 1 is a diagram of the platform structure of an Internet of Things (IoT) system for managing smart gas work order implementation according to some embodiments of the present disclosure.

In some embodiments, the IoT system 100 for managing smart gas work order implementation may be applied to an operation management system for gas and used to perform the method for managing smart gas work order implementation.

As shown in FIG. 1, the IoT system for managing smart gas work order implementation 100 may include: a smart gas user platform 110, a smart gas service platform 120, a smart gas management platform 130, a smart gas sensing network platform 140, and a smart gas object platform 150.

The smart gas user platform 110 may be a platform for interacting with user. In some embodiments, the smart gas user platform 110 may be configured as a terminal device.

In some embodiments, the smart gas user platform 110 may include a gas user sub-platform, a government user sub-platform, and a regulatory user sub-platform. In some embodiments, the gas user sub-platform may interact with the smart gas service sub-platform to access services of safe gas use. The government user sub-platform may interact with the smart operation service sub-platform to access the services of gas operations. In some embodiments, the regulatory user sub-platform may interact with the smart regulatory service sub-platform to obtain services of safety and regulatory needs.

The smart gas service platform 120 may refer to a platform for receiving and transmitting data and/or information such as advisory information, query instructions, fault processing schemes, etc. In some embodiments, the smart gas service platform 120 may include a smart gas service sub-platform, a smart operation service sub-platform, and a smart regulatory service sub-platform.

The smart gas management platform 130 may refer to a platform for coordinating the connection and collaboration between the functional platforms, gathering all the information of the IoT, and providing sensing management and control management functions for the IoT operation system. In some embodiments, the smart gas management platform 130 may include a smart user service management sub-platform, a smart operation management sub-platform, and a smart gas data center.

In some embodiments, the smart gas management platform 130 may be configured to include a processor and a database.

In some embodiments, the database may include one or more types, for example, one or more of a library of work orders to be assigned, a work order database to be implemented, a historical work order database, and a vector database. The type and number of data stored in different types of databases may be different. For example, the number of work orders to be assigned stored in the library of work orders to be assigned may be dynamically changed according to the actual situation, the number of which may be 0~1000. For another example, the number of historical work orders stored in the historical work order database may grow with time, the number of which may be 0~1000000. More descriptions about the library of work orders to be assigned, the work order database to be implemented, the historical work order database, and the vector database may be found in the corresponding descriptions in FIGS. 2 to 5.

The processor may interact with the database based on the network. This database stores data such as algorithms (e.g. convolutional neural networks), instructions, etc. in advance. The processor may directly call the data and/or instructions stored in the database when needed.

In some embodiments, the smart user service management sub-platform may include a message management module. The message management module may be used to push notifications about gas work orders, and also be used to send messages about equipment monitoring alarms, gas usage security inspection monitoring alarms, and gas usage abnormalities to gas operation users.

In some embodiments, the smart operation and management sub-platform may include an integrated office management module that may be used to coordinate operational human resources, public resources, gas equipment, daily office, administration, and other matters.

In some embodiments, the smart gas management platform 130 may interact with the smart gas service platform 120 and the smart gas sensing network platform 140. In some embodiments, the smart gas data center may issue instructions to the smart gas sensing network platform 140 to obtain data related to the gas equipment and receive the data related to the gas equipment.

The smart gas sensing network platform 140 may be a functional platform for the management of sensing communications. In some embodiments, the smart gas sensing network platform 140 may perform the functions of sensing information sensing communication and control information sensing communication.

In some embodiments, the smart gas sensing network platform 140 may include a gas indoor equipment sensing network sub-platform and a gas pipeline network equipment sensing network sub-platform for obtaining data related to the indoor equipment and the pipeline network equipment, respectively.

The smart gas object platform 150 may include a gas indoor equipment object sub-platform and a gas pipeline network equipment object sub-platform.

In some embodiments, the smart gas object platform 150 may include a gas indoor equipment object sub-platform and a gas pipeline network equipment object sub-platform. In some embodiments, the gas indoor equipment object sub-platform may be configured as various types of gas indoor equipment for gas users, and the gas pipeline network equipment object sub-platform may be configured as various types of gas pipeline network equipment and monitoring equipment.

Figure 2:
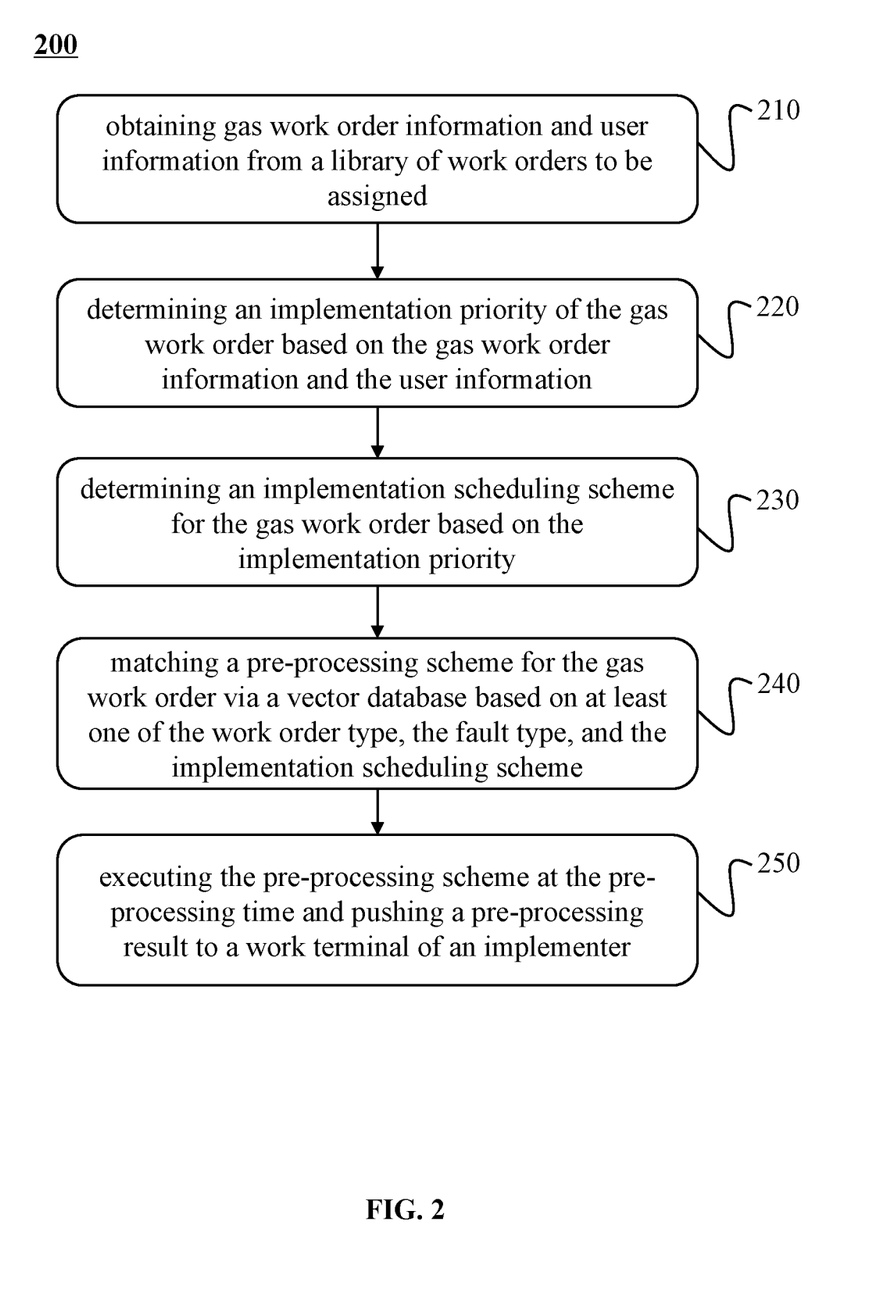
FIG. 2 is an exemplary flowchart of a method for managing smart gas work order implementation according to some embodiments of the present disclosure.

FIG. 2 is an exemplary flowchart of a method for managing smart gas work order implementation according to some embodiments of the present disclosure. In some embodiments, a process 200 may be performed by the smart gas management platform 130.

Step 210, obtaining gas work order information and user information from a library of work orders to be assigned.

The library of work orders to be assigned may include a collection of work orders that need to be assigned.

The gas work order information may include the work order type, fault type, gas availability, and environmental condition at the fault point.

The work order type may include usage breakdown repair, gas installation, gas relocation, gas equipment installation, etc.

The fault types may include ignition fault, unstable flame, insufficient gas firepower, damaged gas valve, abnormal closing of the gas valve, non-closing valve, insufficient pressure in the pipeline network, leakage condition, etc.

The gas availability may include available, unavailable, etc.

The leakage condition may include the duration of the leakage, the leakage rate, etc. The leakage rate may be a sequence composed of leakage rates at multiple moments. In some embodiments, the smart gas management platform 130 may determine the leakage rate based on monitoring information of smart gas IoT. For example, gas leakage may exist when the smart gas management platform 130 monitors gas consumption by a user for a long period of time and/or at non-gas usage time (e.g., midnight).

The environmental condition at the fault point may include ventilation condition.

Ventilation condition may include whether the room has windows, the orientation of the windows, real-time wind speed, etc. Real-time wind speed may be obtained from the wind speed sensor.

User information may include gas usage, number of permanent residents, and gas-using equipment condition.

The gas usage may include the total gas consumption, the frequency of consumption, etc.

The gas-using equipment condition may include the type of equipment, the number of equipment, and the availability of the equipment.

Gas work order information and user information may be obtained through user feedback, data stored in the gas platform, or gas platform monitoring data.

Step 220, determining an implementation priority of the gas work order based on the gas work order information and the user information.

Implementation priority is the priority of processing gas work orders. Implementation priority may be divided by values, for example, levels 1-10, the higher the level, the higher the priority.

Figure 3:
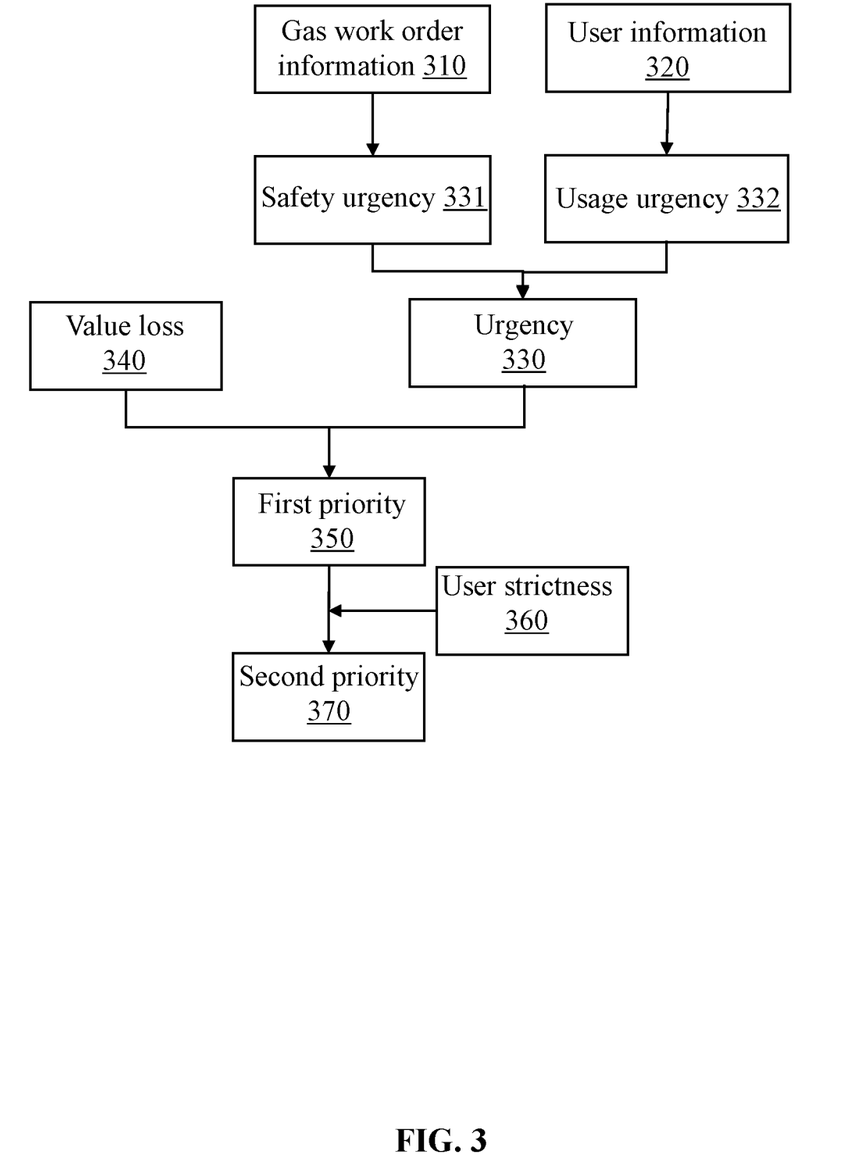
FIG. 3 is an exemplary schematic diagram for determining implementation priority according to some embodiments of the present disclosure.

In some embodiments, the smart gas management platform 130 may determine the urgency of a gas work order based on gas work order information and user information to further determine the implementation priority, more descriptions may be found in the descriptions in FIG. 3.

Step 230, determining an implementation scheduling scheme for the gas work order based on the implementation priority.

The implementation scheduling scheme may include target implementation time, etc. The target implementation time is the time at which a gas work order is processed.

In some embodiments, the smart gas sensing network platform 130 may determine at least one candidate implementation time based on a latest completion time, a user acceptable time period, and rank the work orders to be implemented in the at least one candidate implementation time based on the implementation priority to determine the target implementation time.

In some embodiments, the smart gas sensing network platform 130 may divide one or more time periods as candidate implementation times by using the time required to complete the implementation scheduling scheme as a unit time period within a user acceptable time period before the latest completion time.

In some embodiments, the work orders to be implemented may be obtained through the library of work orders to be implemented. The library of work orders to be implemented may include a collection of work orders to be implemented after being assigned.

In some embodiments, the smart gas management platform 130 may use a candidate implementation time that satisfies the time required to complete the implementation scheduling scheme as a target implementation time. If multiple target implementation times exist, the earliest time period or the time period with the most available implementer may be selected as the preferred target implementation time.

In some embodiments, in response to a determination that a plurality of candidate implementation time satisfy the work order priority condition, the smart gas management platform 130 may preferentially select a time period during a low peak period of gas as the target implementation time.

Satisfying work order priority condition may be that in a candidate implementation time period, one or more work orders need to be scheduled, which are ranked by implementation priority, and it is determined by the smart gas management platform 130 that the one or more work orders may be processed within the candidate time period.

Low-peak period of gas refers to a time period when gas usage is at the low point of the gas consumption curve. Prioritizing to realize the implementation scheduling scheme during low peak period of gas may reduce the inconvenience of gas use due to maintenance and help to improve user satisfaction.

In some embodiments of the present disclosure, the implementation scheduling scheme is determined according to the implementation priority of gas work orders, and the impact of different factors on gas work order processing is considered, which improves the efficiency of gas work order processing, reduces the rate of user complaints, and increases user satisfaction.

Step 240, matching a pre-processing scheme for the gas work order via a vector database based on at least one of the work order type, the fault type, and the implementation scheduling scheme.

A vector database is a database for storing, indexing, and querying vectors. The smart gas management platform 130 may quickly perform similarity queries and other vector management based on the large number (e.g., greater than 100,000) of vector data stored in the vector database.

Pre-processing scheme is the scheduling of matters related to the processing of work orders. The pre-processing scheme may include pre-processing content and pre-processing time.

Pre-processing content refers to the preparatory work done before the implementation, which is used for the reference of the implementer. Pre-processing content may include data collection, demand estimation of maintenance materials, traffic scheme recommendations, etc. The demand estimation of maintenance materials may include determining whether to repair based on experience, determining the type of data and the type of materials needed for different types of faults. In some embodiments, the traffic scheme may be recommended based on historical road traffic conditions during the time period in which the implementation time is.

The pre-processing time is the implementation time of the pre-processing scheme. In some embodiments, the pre-processing time is earlier than the workday on which the implementation time falls, e.g., the pre-processing time is before the workday on which the implementation time falls, so that the pre-processing result is pushed to the implementer at least one day earlier.

Figure 4:
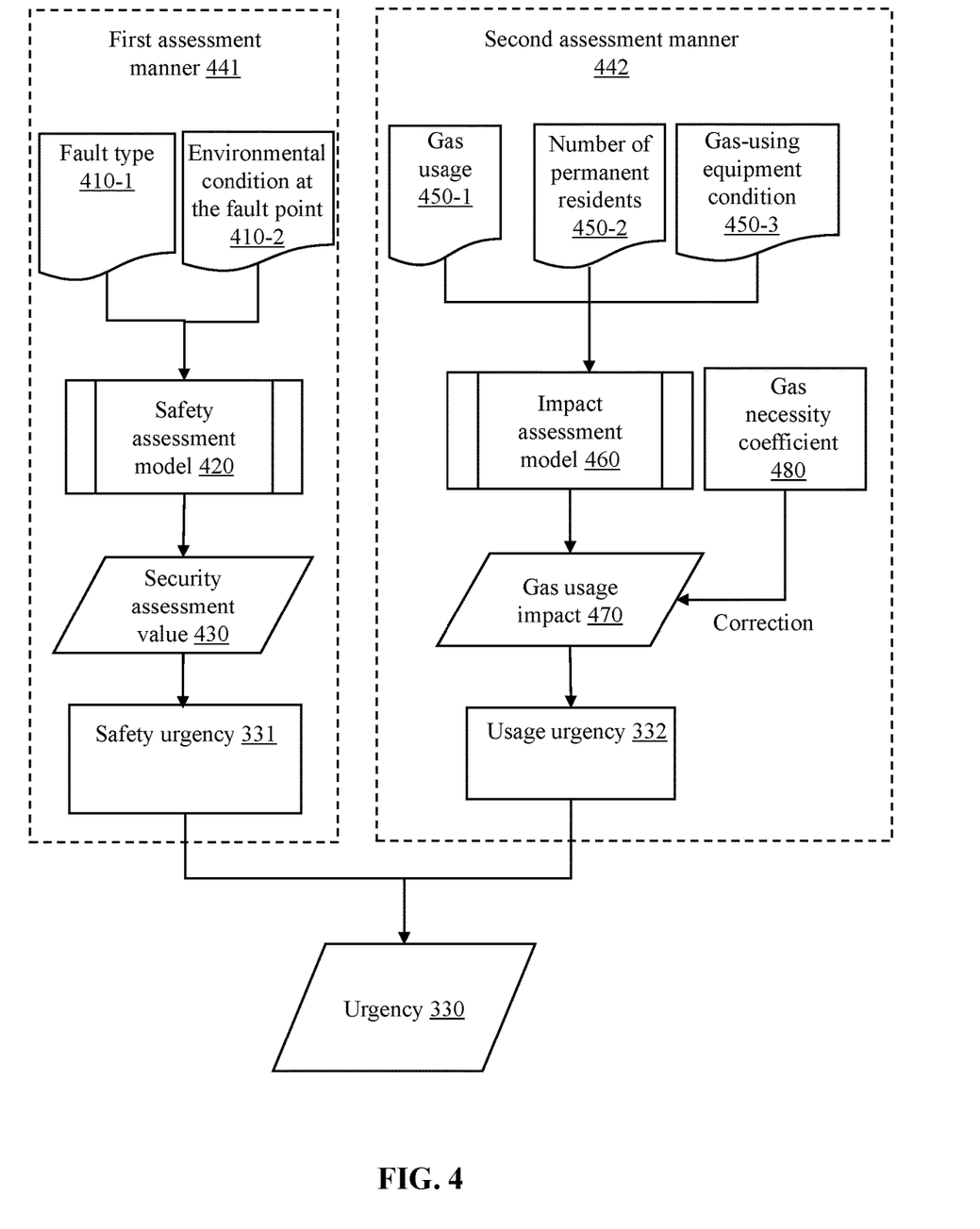
FIG. 4 is an exemplary schematic diagram for determining the urgency according to some embodiments of the present disclosure.

In some embodiments, the relevant embodiments of the pre-processing scheme determined based on a vector database may be referred to the illustration corresponding to the determination of the first assessment manner by vector retrieval method in FIG. 4.

Step 250, executing the pre-processing scheme at the pre-processing time and pushing a pre-processing result to a work terminal of an implementer.

The pre-processing result is the result corresponding to the execution of the pre-processing scheme. For example, the pre-processing result includes maintenance supplies that may be used in the implementation of the work order and recommendations for traffic schemes.

Implementer is the staff who completes the implementation of the scheduling scheme, for example, gas maintenance staff, etc.

A work terminal is a terminal device used by implementer to receive work scheduling.

In some embodiments, the smart gas management platform 130 may push pre-processing result to the work terminal of implementer for reference.

In some embodiments of the present disclosure, the implementation scheduling scheme of gas work order is determined according to the implementation priority of the gas work order, which reasonably schedules gas work orders and improves the processing efficiency of gas work orders. The implementation scheduling scheme and pre-processing scheme are determined based on various information, which considers the possible impact of multiple factors and improves the accuracy of gas work order processing.

FIG. 3 is an exemplary schematic diagram for determining implementation priority according to some embodiments of the present disclosure.

In some embodiments, determining the implementation priority of the gas work order based on the gas work order information and the user information includes: determining the urgency of the gas work order based on the gas work order information and the user information; and determining an implementation priority through ladder segmentation based on the urgency. The ladder segmentation relates to the value loss of gas work order in historical data, which includes at least one of the loss of gas use and the value loss of user review.

In some embodiments, the smart gas management platform 130 may determine the urgency based on historical experience according to gas work order information and user information. For example, a gas work order is more urgent when gas availability is completely unavailable or the acceptable time of the user is closer to the current time.

In some embodiments, as shown in FIG. 3, the smart gas management platform 130 separately determines a safety urgency 331 and a usage urgency 332 based on gas work order information 310 and user information 320 to further determine an urgency 330, more descriptions may be found in the descriptions of FIG. 4.

In some embodiments, the implementation priority includes a first priority, and determining the implementation priority may include determining the first priority by ladder segmentation.

In some embodiments, ladder segmentation includes classifying gas work orders with an urgency in the same preset urgency interval into the same class. The urgency may be expressed in numbers. For example, if the urgency may be any value between 0 and 10, then gas work orders with an urgency of 0 to 2 may be classified as class 1, gas work orders with an urgency of 2 to 4 may be classified as glass 2, and so on, the higher the urgency, the higher the corresponding of the first priority.

In some embodiments, the criteria for ladder segmentation may be determined based on the value loss of gas work order with different urgency in the historical data. The similarity between the urgency of the historical gas work order and the urgency of the current gas work order is compared, and if the similarity exceeds a threshold, the value loss of the historical gas work order may be used. The higher the urgency of the gas work order, the more serious the value loss from delayed processing, and the higher the first priority.

The value loss 340 refers to the adverse effects caused by the gas problem. In some embodiments, the value loss may include at least one of loss of gas use and value loss of user review.

Loss of gas use may include loss caused by reduced gas usage of user, gas leakage or other condition, etc.

The value loss of user review includes decreases in user review caused by long processing time for gas work order or other reasons. The more severe the decrease in user review, the higher the value loss of user review.

In some embodiments, the implementation priority also includes a second priority. As shown in FIG. 3, determining the implementation priority may also include further ranking the gas work orders within each ladder by user strictness 360 to obtain the second priority 370 after dividing each ladder (i.e., after determining the first priority 350).

User strictness 360 is the user's acceptance of gas work order processing time.

In some embodiments, the smart gas management platform 130 may also obtain the implementation on-time status of the work orders that the user has complained about; the smart gas management platform 130 may retrieve the work order complaint rate corresponding to the work orders with the same implementation on-time status in the historical gas work orders, wherein the method of retrieval may include Approximate Nearest Neighbor Search (ANN); and determine the user strictness by a preset formula based on this work order complaint rate. The user strictness may be negatively correlated with the work order complaint rate for work orders with the same implementation punctuality. For example, if a work order with a similar implementation punctuality as a work order 1 has a low work order complaint rate, but user A complains about this work order, then user A has a high strictness on time.

Figure 5:
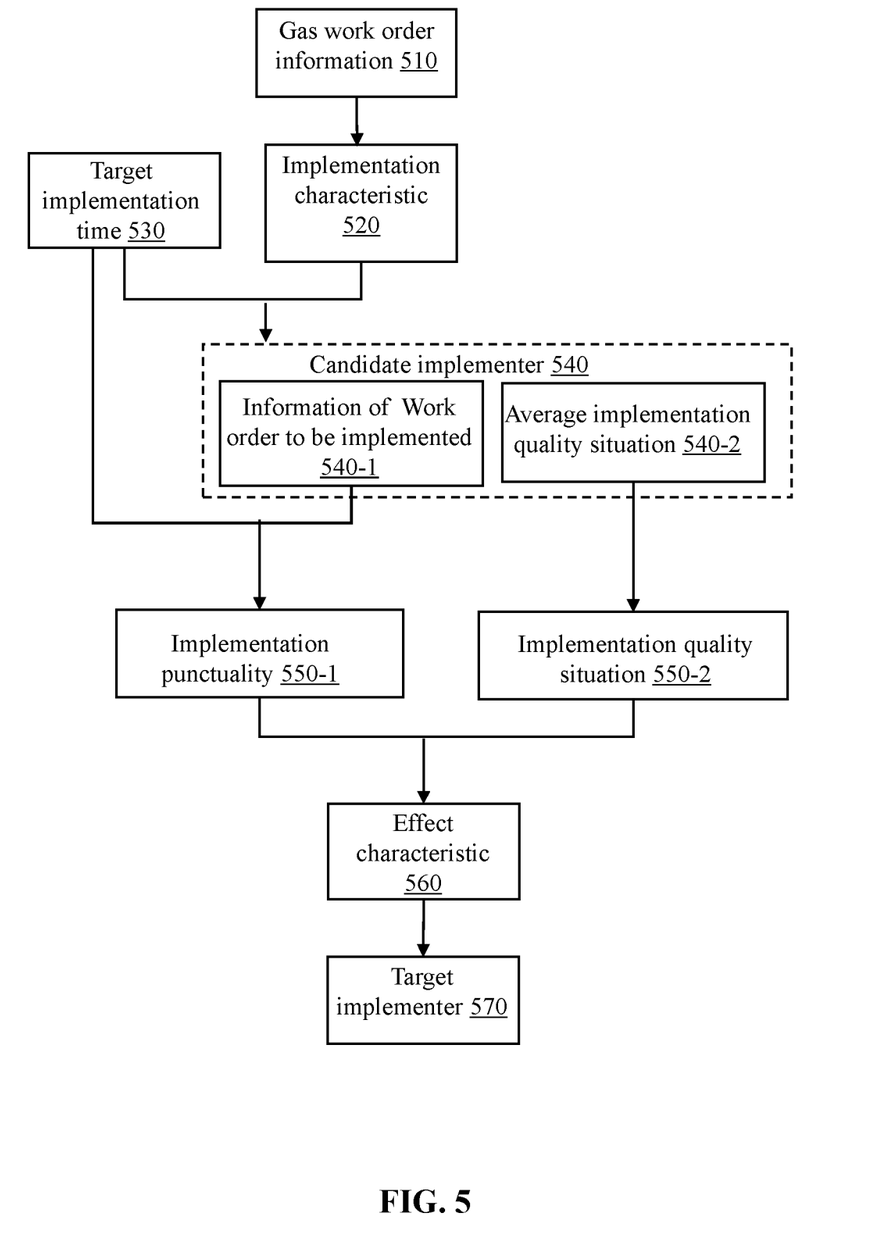
FIG. 5 is an exemplary schematic diagram of determining the target implementer according to some embodiments of the present disclosure.

Details on the implementation punctuality may be found in FIG. 5 and its related contents.

The work order complaint rate is the frequency of complaints about gas work order. In some embodiments, the work order complaint rate may be obtained from data stored on the gas platform.

In some embodiments of the present disclosure, user strictness is determined based on the implementation punctuality, work order complaint rate, and preset formulas, which improves the accuracy of determination of the implementation scheduling scheme and pre-processing scheme as well as the efficiency of gas work order processing.

In some embodiments of the present disclosure, the second priority of gas work orders is determined in conjunction with user strictness, which facilitates targeted improvement in user satisfaction.

In some embodiments of the present disclosure, the urgency of gas work order is determined based on gas work order information and user information, and the implementation priority is determined by ladder segmentation, which takes into account the impact that gas work orders and users may have on the urgency of gas work order, and more clearly and explicitly represents the processing order of gas work order, which is conducive to improving the processing efficiency of the gas work order and satisfaction of the user.

FIG. 4 is an exemplary schematic diagram for determining the urgency according to some embodiments of the present disclosure.

As shown in FIG. 4, the urgency 330 may include a safety urgency 331 as well as a usage urgency 332; Determining the urgency 330 of the gas work order based on the gas work order information and the user information may include: determining the safety urgency 331 by a first assessment manner 441 based on the gas work order information; determining the usage urgency 332 by a second assessment manner 442 based on the user information; and determining the urgency 330 based on the safety urgency 331 and the usage urgency 332.

The safety urgency may refer to the urgency for eliminating the impact of a gas safety hazard.

The usage urgency may refer to the urgency of the user using the gas.

The first and second assessment manners may refer to the methods used to determine the safety urgency and the usage urgency, respectively.

In some embodiments, the smart gas management platform 130 may determine the first assessment manner in a variety of ways based on gas work order information and user information. The first assessment manner may be determined by vector retrieve method.

In some embodiments, the smart gas management platform 130 may construct a vector database corresponding to the assessment manner based on historical experience, the vector database including a plurality of reference vectors and the corresponding preferred assessment manner. Each reference vector characterizes historical gas work order information and historical user information. For each reference vector, it is assessed by a predefined assessment mechanism, and if its assessment result is better, the preferred assessment manner corresponding to that reference vector is used as the first assessment method. A better assessment result may indicate the benefit of improving the efficiency of the overall system implementation management.

The process for determining the second assessment manner may be similar to that described above for the first assessment manner.

In some embodiments, after determining the corresponding preferred assessment manner as a first assessment manner, the smart gas management platform 130 processes the gas work order information based on this first assessment manner to obtain a safety urgency.

As shown in FIG. 4, the first assessment manner 441 may include: predicting a safety assessment value 430 by a safety assessment model 420 based on the fault type 410-1 and the environmental condition at the fault point 410-2; and determining the safety urgency 331 based on the safety assessment value 430.

The safety assessment model may be a trained machine learning model. For example, the safety assessment model may include any one or a combination of convolutional neural networks, custom model structures, or other models, etc.

The safety assessment value is one or more fault types and their respective corresponding risk values. The safety assessment value may characterize the probability of occurrence of a fault type through the probability of risk (e.g., percentage). For example, the safety assessment value may include that a risk of having insufficient pressure in the pipeline network is 50%.

In some embodiments, the inputs of the safety assessment model may include the fault type, the environmental condition at the fault point, the target duration, and the output of the safety assessment model may be the safety assessment value at the end of the target duration. The target duration may refer to the available time submitted by the user. More description about the fault type and the environmental condition at the fault point may be found in FIG. 2 and its related description.

In some embodiments, the smart gas management platform 130 may train a safety assessment model based on a large number of first training samples with labels. For example, a large number of first training samples with labels may be input into the initial safety assessment model, a loss function may be constructed from the labels and the results of the initial safety assessment model, and the parameters of the initial safety assessment model may be updated iteratively by gradient descent or other methods based on the loss function. The model training is completed when the preset condition is satisfied, and the trained safety assessment model is obtained. The preset condition may be the convergence of the loss function, the number of iterations reaching a threshold, etc.

The first training samples may be a large number of different sample fault types, sample environment condition at fault points, sample target duration, and its label may be the sample safety assessment value at the end of the corresponding sample target duration. In some embodiments, the first training sample and the label may be determined by laboratory simulation. The number of data for the first training samples and their labels may be greater than 1000.

In some embodiments, the smart gas management platform 130 may determine the gas safety urgency based on the safety assessment value, and if safety assessment values for a plurality of target durations are predicted, use the maximum value of the plurality of safety assessment values as the gas safety urgency to ensure that the work order may be processed earlier to eliminate safety risks.

In some embodiments of the present disclosure, the use of a safety assessment model to process the fault type and the environmental condition at the fault point to predict the safety assessment value may improve the accuracy of the predicted safety assessment value, which in turn facilitates the subsequent determination of the safety urgency.

In some embodiments, after determining the corresponding preferred assessment manner as a second assessment manner, the user information is processed based on the second assessment manner to obtain the usage urgency.

As shown in FIG. 4, the second assessment manner 442 may include: determining gas usage impact 470 through an impact assessment model 460 based on gas usage 450-1, number of permanent residents 450-2, and gas-using equipment condition 450-3; and determining the usage urgency 332 by correcting the gas usage impact 470 based on a gas necessity coefficient 480.

Gas use impact may refer to the impact related to the demand for gas uses. For example, inability to heat, insufficient hot water provided by the water heater, etc. The gas use impact may be expressed by a total frequency of reduction in the use of gas-using equipment.

The impact assessment model may include any one or a combination of convolutional neural networks, custom model structures, other models, etc.

In some embodiments, the input of the impact assessment model may include gas usage, number of permanent residents, gas-using equipment condition, and target duration (not shown), and the output of the impact assessment model may be gas usage impact. More information on gas usage and gas-using equipment may be found in FIG. 2 and its related description.

In some embodiments, the smart gas management platform 130 may train an impact assessment model based on a large number of second training samples with labels. More training process about the impact assessment model may be referred to the training content of the safety assessment model.

The second training sample may be a large number of different sample gas usage, number of sample permanent residents, sample gas-using device condition, and sample target duration, its label may be the corresponding sample gas usage impact. In some embodiments, the second training sample may be obtained from statistics on user research, and the label may be the total frequency of use reduction corresponding to the gas-using device under the data of the second training sample. The number of data for the second training sample and its label may be greater than 1000.

The gas necessity coefficient may refer to a coefficient that characterizes the necessity of gas use and may be expressed as a percentage.

In some embodiments, the gas necessity coefficient is related to the frequency of gas use under the same weather information in the user's historical gas use record. The more frequency of the gas usage, the greater the corresponding gas necessity coefficient.

In some embodiments, the smart gas management platform 130 may determine a gas necessity coefficient based on the frequency of gas use by a table lookup.

In some embodiments, the smart gas management platform 130 may correct gas usage impact in a variety of ways based on the gas necessity coefficient. For example, the smart gas management platform 130 may correct gas usage impact by a preset formula including the gas necessity coefficient.

In some embodiments, the smart gas management platform 130 may determine the usage urgency based on the corrected gas use impact in a variety of ways. For example, the usage urgency may be determined by the table lookup based on the corrected gas use impact.

Determining gas use impact through the use of impact assessment model improves the accuracy of determining gas use impact, and correcting gas use impact based on the gas necessity coefficient further improves the accuracy of determining usage urgency.

In some embodiments, the smart gas management platform 130 may determine the urgency by weighting and summing the safety urgency and the usage urgency based on preset weights. The preset weight of safety urgency is higher than that of usage urgency.

Full and rational use of safety urgency and usage urgency through a weighted process may cause the determined urgency more accurate. The work orders with a higher safety urgency are considered to have a higher safety risk, and larger weights are given to the work orders, which may ensure that the work orders with a higher safety urgency are given priority for processing and reduce the possibility of safety accidents.

In some embodiments of the present disclosure, a first assessment manner and a second assessment manner are referenced to determine the safety urgency and the usage urgency respectively to further determine the urgency of the gas work order and improve the comprehensiveness and reliability of determining the urgency.

FIG. 5 is an exemplary schematic diagram of determining a target implementer according to some embodiments of the present disclosure.

In some embodiments, the implementation scheduling scheme may also include a target implementer, and determining the target implementer may include: determining, by the smart gas management platform 130, the implementation characteristic 520 of a gas work order based on the gas work order information 510 through a historical work order database (not shown); determining at least one candidate implementer 540 based on the implementation characteristic 520 and the target implementation time 530; predicting the effect characteristic 560 corresponding to at least one candidate implementer 540; and determining target implementer 570 based on the effect characteristic 560.

The candidate implementer may refer to a backup implementer who may implement a gas work order.

The target implementer may refer to the staff who ultimately implements the gas work order.

Implementation characteristic may refer to the level of staff required to implement the work order, experience profile, and other characteristic.

In some embodiments, the implementation characteristic may include enhanced characteristic after enhancement processing based on the enhancement coefficient. The enhancement coefficient is determined based on the complexity of the user's gas pipeline routing and the user strictness.

The enhancement coefficient may refer to the coefficient used to enhance the implementation characteristic. The enhancement coefficient may be determined by means of pre-defined calculation rules. In some embodiments, the implemented characteristic after enhancement processing based on the enhancement coefficient is an enhanced characteristic.

In some embodiments, the higher the complexity of the user's gas pipeline routing and the higher the user's strictness, the greater the corresponding enhancement coefficient, which in turn may be matched with implementer with higher routing titles and more experience to ensure implementation effectiveness, as well as user satisfaction.

By enhancing the experimental characteristic based on enhancement coefficients, the implementation characteristic may be reasonably and appropriately enhanced to match higher-level and more experienced implementer, which may be used to further ensure the effectiveness of work order implementation and improve user satisfaction.

In some embodiments, the smart gas management platform 130 may determine the implementation characteristic of a gas work order based on the gas work order information by various means, such as table lookup.

In some embodiments, the smart gas management platform 130 may retrieve, based on the gas work order information, among a large number (e.g., greater than 100,000) of historical work order data stored in the historical work order database based on a similarity threshold, and determine the characteristic corresponding to the retrieved reference vectors with a similarity above the similarity threshold as implementation characteristic.

Similarity may refer to a degree of similarity between the current gas work order information and the reference gas work order information in the historical work order database. The similarity threshold may refer to the minimum value of similarity. The higher the urgency, the larger the corresponding similarity threshold, so that urgent gas work orders may be processed in a timely manner, improving the rationality of the work order implementation sequence.

In some embodiments, the smart gas management platform 130 may retrieve, based on the gas work order information, reference gas work order information with a similarity greater than a similarity threshold in the historical work order database, and determine the implementation characteristic of the gas work order based on the implementation characteristic corresponding to the reference gas work order. For example, the average of the implementation characteristic corresponding to the reference gas work order is used as the implementation characteristic of the current gas work order.

The implementation characteristic is determined by searching in the historical work order database according to a similarity threshold based on the gas work order information, which further makes the determination of the implementation characteristic of gas work orders more reliable and helps ensure implementation effectiveness.

In some embodiments, an implementer who satisfies the implementation characteristic and may implement the gas work order within the target implementation time is determined as at least one candidate implementer based on the implementation characteristic and the target implementation time.

Effect characteristic may refer to characteristic used to characterize the effectiveness of the implementation of a gas work order.

In some embodiments, the effect characteristic corresponding to at least one candidate implementer may be predicted in a variety of ways. For example, the corresponding effect characteristic of candidate implementer is predicted based on their historical business assessment reviews, etc.

In some embodiments, the predicting effect characteristic 560 may include: predicting implementation punctuality 550-1 based on the information of work order to be implemented 540-1 of the candidate implementer 540 and target implementation time 530; predicting implementation quality situation 550-2 based on the average implementation quality situation 540-2 of the candidate implementer 540; determining the effect characteristic 560 by weighting and summing based on the implementation punctuality 550-1 and implementation quality situation 550-2, wherein the weight is related to the user's historical complaint record.

The implementation punctuality may include how long the work order is processed in advance, just on time, and how long the work order is delayed to process.

The implementation quality situation may include excellent, good, qualified, or unqualified implementation quality.

In some embodiments, the smart gas management platform 130 may estimate the time for a candidate implementer to start implementing the work order based on the information of work order to be implemented of the candidate implementer, target implementation time, and traffic time, and predict the implementation punctuality based on the start implementation time. The traffic time may be calculated based on the location information.

In some embodiments, the smart gas management platform 130 may determine the implementation quality situation based on the historical work order implementation quality records of candidate implementer in conjunction with the relevant assessment manners and regulations of the gas company.

In some embodiments, the smart gas management platform 130 may determine the effect characteristic by weighting and summing based on the implementation punctuality and the implementation quality situation, wherein the weights are related to the user historical complaint records.

User historical complaint records may include delayed work order processing, substandard implementation quality, etc. If there are more delays in the processing of work orders in the user's historical complaint records, the weight of the implementation there are more delays in the processing of work orders in the user's historical complaint records, the weight of the implementation punctuality is greater.

By determining the effect characteristic through a weighted sum of the implementation punctuality and the implementation quality situation, the effect characteristic may be determined more comprehensively and accurately.

In some embodiments, the smart gas management platform 130 may determine target implementer based on effect characteristic. For example, the effect characteristics are ranked in order from large to small, and the candidate implementer corresponding to the first ranked effect characteristic is used as the target implementer.

In some embodiments of the present disclosure, considering implementer in the implementation scheduling scheme and determining candidate implementer based on competency requirements and further screening to determine target implementer are beneficial to improve the efficiency of gas work order processing and service quality.

Figure 6:
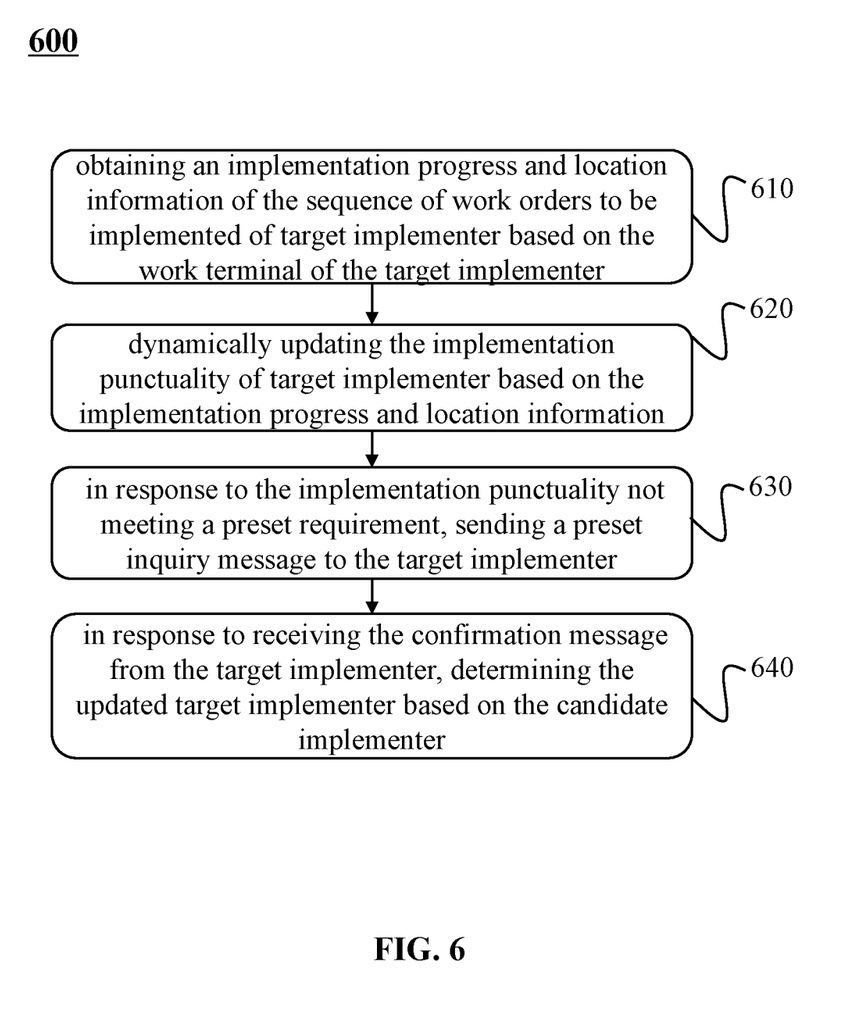
FIG. 6 is an exemplary schematic diagram of a dynamic update target implementer according to some embodiments of the present disclosure.

FIG. 6 is an exemplary schematic diagram of a dynamic update target implementer according to some embodiments of the present disclosure. In some embodiments, a process 600 may be performed by smart gas management platform 130.

Step 610, obtaining an implementation progress and location information of the sequence of work orders to be implemented of target implementer based on the work terminal of the target implementer.

The sequence of work orders to be implemented may refer to the sequence composed of work orders to be implemented by the same target implementer.

Implementation progress may refer to the completion progress of the work order to be implemented.

Step 620, dynamically updating the implementation punctuality of target implementer based on the implementation progress and location information.

More description on determining implementation punctuality may be found in FIG. 5 and its related description.

Step 630, in response to the implementation punctuality not meeting a preset requirement, sending a preset inquiry message to the target implementer.

Preset requirement may refer to the implementation punctuality requirements for the target implementer. For example, the preset requirement may be that a value corresponding to the implementation punctuality is greater than or equal to the punctuality threshold, i.e., the work order is completed early or just on time.

Preset inquiry information may refer to information used to confirm whether or not the implementation cannot be performed on time.

In some embodiments, in response to the implementation punctuality not meeting the preset requirement, the smart gas management platform 130 sends a preset inquiry message to be received by the work terminal of the target implementer.

Step 640, in response to receiving the confirmation message from the target implementer, determining the updated target implementer based on the candidate implementer.

Confirmation messages may refer to messages for confirming that the implementation cannot be performed on time.

In some embodiments, in response to receiving the confirmation message from the target implementer, the smart gas management platform 130 may take the candidate implementer corresponding to the second ranked effect characteristic as the updated target implementer. More description about the effect characteristic may be found in FIG. 5 and its related description.

In some embodiments of the present disclosure, the target implementer is dynamically updated based on the implementation progress and location information, which allows the confirmation of the target implementer to be flexibly changed according to the specific situation and helps to improve the efficiency of processing gas work orders.

Certain features, structures, or characteristics of one or more embodiments of the present disclosure may be suitably combined. In some embodiments, the numerical parameters used in the disclosure and claims are approximations, which can change depending on the desired characteristics of individual embodiments.

What is claimed is:

1. A method for managing smart gas work order implementation, wherein the method is performed by an Internet of Things system for managing smart gas work order implementation, the Internet of Things system for managing smart gas work order implementation includes a smart gas user platform, a smart gas service platform, a smart gas management platform, a smart gas object platform, and a smart gas sensing network platform, the smart gas management platform includes a processor and a database, the database includes one or more of a library of work orders to be assigned, a work order database to be implemented, a historical work order database, and a vector database, the smart gas object platform includes a gas indoor equipment object sub-platform and a gas pipeline network equipment object sub-platform, the gas indoor equipment object sub-platform is configured as various types of gas indoor equipment for gas users, the gas pipeline network equipment object sub-platform is configured as various types of gas pipeline network equipment and monitoring equipment, and the method comprises:

obtaining, the smart gas sensing network platform, data related to gas equipment by issuing instructions to through the smart gas management platform;

receiving, by the smart gas management platform, the data related to the gas equipment transmitted from the smart gas sensing network platform;

obtaining, by the smart gas management platform, gas work order information and user information from the library of work orders to be assigned; wherein the gas work order information includes at least one of work order type, fault type, gas availability, and environmental condition at a fault point, and the user information includes at least one of gas usage, a number of permanent residents, and gas-using equipment condition;

determining, by the smart gas management platform, an implementation priority of gas work order based on the gas work order information and the user information; wherein the determining an implementation priority of gas work order based on the gas work order information and the user information includes:

determining an urgency of the gas work order based on the gas work order information and the user information; the urgency of the gas work order including usage urgency and safety urgency; wherein the determining an urgency of the gas work order based on the gas work order information and the user information includes:

determining the safety urgency by a first assessment manner based on the gas work order information; wherein the first assessment manner includes:

predicting a safety assessment value by a safety assessment model based on the fault type and the environmental condition at the fault point;

determining the safety urgency based on the safety assessment value; wherein the safety assessment model is obtained by training an initial safety assessment model based on a large number of first training samples with labels, the first training samples are a large number of different sample fault types, sample environment condition at fault points, sample target duration, a label is a sample safety assessment value at an end of a corresponding sample target duration, and the training an initial safety assessment model includes:

inputting the large number of first training samples with labels into the initial safety assessment model;

constructing a loss function from the labels and results of the initial safety assessment model;

updating parameters of the initial safety assessment model iteratively based on the loss function; and in response to determining that a preset condition is satisfied, completing the training of the initial safety assessment model, and obtaining a trained safety assessment model;

determining the usage urgency by a second assessment manner based on the user information; and determining the urgency based on the safety urgency and the usage urgency;

determining the implementation priority by ladder segmentation based on the urgency, wherein the ladder segmentation is related to a loss of value of the gas work order in historical data, the loss of value including at least one of loss of gas use and loss of value of user review;

determining an implementation scheduling scheme for the gas work order based on the implementation priority, the implementation scheduling scheme including a target implementation time;

matching a pre-processing scheme for the gas work order via a vector database based on at least one of the work order type, the fault type, and the implementation scheduling scheme, the pre-processing scheme including pre-processing content and pre-processing time; and executing the pre-processing scheme at the pre-processing time and pushing a pre-processing result to a work terminal of an implementer through the smart gas user platform.

2. The method according to claim 1, wherein the determining an implementation scheduling scheme for the gas work order based on the implementation priority includes:

determining at least one candidate implementation time based on a latest completion time and a user acceptable time period; and determining the target implementation time by ranking work order to be implemented in the at least one candidate implementation time based on the implementation priority.

3. The method according to claim 2, wherein the implementation scheduling scheme further includes a target implementer, and determining the target implementer includes:
 determining, based on the gas work order information, implementation characteristic of the gas work order via a historical work order database;
 determining at least one candidate implementer based on the implementation characteristic and the target implementation time;
 predicting effect characteristic corresponding to the at least one candidate implementer; and
 determining the target implementer based on the effect characteristic.

4. The method according to claim 3, wherein the determining, based on the gas work order information, implementation characteristic of the gas work order via a historical work order database includes:
 determining the implementation characteristic by searching in the historical work order database according to a similarity threshold based on the gas work order information, wherein the similarity threshold is related to the urgency of the gas work order.

5. The method according to claim 3, wherein the method further comprises dynamically updating the target implementer, including:
 obtaining an implementation progress and location information of work order sequence to be implemented of the target implementer based on a work terminal of the target implementer;
 dynamically updating an implementation on-time status of the target implementer based on the implementation progress and the location information;
 sending a preset inquiry message to the target implementer in response to the implementation on-time status not meeting a preset requirement; and
 in response to receiving confirmation information from the target implementer, determining an updated target implementer based on the candidate implementer.

6. An Internet of Things system for managing smart gas work order implementation, the Internet of Things system for managing smart gas work order implementation includes a smart gas user platform, a smart gas service platform, a smart gas management platform, a smart gas object platform, and a smart gas sensing network platform, the smart gas management platform includes a processor and a database, the database includes one or more of a library of work orders to be assigned, a work order database to be implemented, a historical work order database, and a vector database, the smart gas object platform includes a gas indoor equipment object sub-platform and a gas pipeline network equipment object sub-platform, the gas indoor equipment object sub-platform is configured as various types of gas indoor equipment for gas users, the gas pipeline network equipment object sub-platform is configured as various types of gas pipeline network equipment and monitoring equipment, wherein the Internet of Things system is configured to perform operations including:
 obtaining data related to gas equipment by issuing instructions to the smart gas sensing network platform through the smart gas management platform, and receiving the data related to the gas equipment transmitted from the smart gas sensing network platform;
 obtaining, by the smart gas management platform, gas work order information and user information from the library of work orders to be assigned, wherein the gas work order information includes at least one of work order type, fault type, gas availability, and environmental condition at a fault point; and the user information includes at least one of gas usage, a number of permanent residents, and gas-using equipment condition;
 determining, by the smart gas management platform, an implementation priority of gas work order based on the gas work order information and the user information, wherein to determine an implementation priority of the gas work order based on the gas work order information and the user information, the smart gas management platform is further configured to:
  determine an urgency of the gas work order based on the gas work order information and the user information; the urgency of the gas work order including usage urgency and safety urgency, wherein to determine an urgency of the gas work order based on the gas work order information and the user information, the smart gas management platform is further configured to perform operations including:
   determining the safety urgency by a first assessment manner based on the gas work order information; wherein the first assessment manner includes:
    predicting a safety assessment value by a safety assessment model based on the fault type and the environmental condition at the fault point;
    determining the safety urgency based on the safety assessment value; wherein the safety assessment model is obtained by training an initial safety assessment model based on a large number of first training samples with labels, the first training samples are a large number of different sample fault types, sample environment condition at fault points, sample target duration, a label is a sample safety assessment value at an end of a corresponding sample target duration, and the training an initial safety assessment model includes:
     inputting the large number of first training samples with labels into the initial safety assessment model;
     constructing a loss function from the labels and results of the initial safety assessment model;
     updating parameters of the initial safety assessment model iteratively based on the loss function; and
     in response to determining that a preset condition is satisfied, completing the model training of the initial safety assessment model, and obtaining a trained safety assessment model;
   determining the usage urgency by a second assessment manner based on the user information; and
   determining the urgency based on the safety urgency and the usage urgency;
  determine the implementation priority by ladder segmentation based on the urgency, wherein the ladder segmentation is related to a loss of value of the gas work order in historical data, the loss of value including at least one of loss of gas use and loss of value of user review;
 determine an implementation scheduling scheme for the gas work order based on the implementation priority; the implementation scheduling scheme including a target implementation time;
 match a pre-processing scheme for the gas work order via a vector database based on at least one of the work order type, the fault type, and the implementation scheduling scheme, the pre-processing scheme including pre-processing content and pre-processing time; and execute the pre-processing scheme at the pre-processing time and pushing a pre-processing result to a work terminal of an implementer through the smart gas user platform.

\* \* \* \* \*